(12) United States Patent
Breu et al.

(10) Patent No.: US 11,671,016 B2
(45) Date of Patent: Jun. 6, 2023

(54) MULTI-PHASE DIRECT VOLTAGE CONVERTER FOR A FUEL CELL STACK

(71) Applicant: AUDI AG, Ingolstadt (DE)

(72) Inventors: Martin Breu, Münster/Steinach (DE); Maximilian Schiedermeier, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 17/042,042

(22) PCT Filed: Mar. 25, 2019

(86) PCT No.: PCT/EP2019/057441
§ 371 (c)(1),
(2) Date: Sep. 25, 2020

(87) PCT Pub. No.: WO2019/185547
PCT Pub. Date: Oct. 3, 2019

(65) Prior Publication Data
US 2021/0021195 A1 Jan. 21, 2021

(30) Foreign Application Priority Data
Mar. 29, 2018 (DE) ...................... 10 2018 204 845.2

(51) Int. Cl.
*H02M 3/158* (2006.01)
*B60L 50/75* (2019.01)

(52) U.S. Cl.
CPC .......... *H02M 3/1584* (2013.01); *B60L 50/75* (2019.02); *B60L 2210/10* (2013.01)

(58) Field of Classification Search
None
See application file for complete search history.

(56) References Cited

U.S. PATENT DOCUMENTS

| 8,039,987 B2 * | 10/2011 | Sawada ................. B60K 6/365 |
| | | 307/9.1 |
| 10,630,182 B2 * | 4/2020 | Murakami .......... H02M 3/1584 |
| 10,938,322 B2 * | 3/2021 | Fu .......................... H02M 7/538 |
| 2014/0268939 A1 | 9/2014 | Tomas et al. |

FOREIGN PATENT DOCUMENTS

| DE | 10 2007 025 229 A1 | 12/2008 |
| DE | 10 2011 018 355 A1 | 10/2012 |
| DE | 10 2014 201 615 A1 | 7/2015 |
| DE | 11 2016 001 334 T5 | 12/2017 |
| EP | 2 034 583 A1 | 3/2009 |

OTHER PUBLICATIONS

Grote, Karl-Heinz et al., "Dubbel—Taschenbuch für den Maschinenbau", 22nd edition. Berlin: Springer-Verlag, 2007, p. V42, Figure 12a, 12b, paragraph 2, ISBN 978-3-540-49714-1.

* cited by examiner

*Primary Examiner* — Jeffrey A Gblende
(74) *Attorney, Agent, or Firm* — Seed Intellectual Property Law Group LLP

(57) ABSTRACT

A multi-phase converter for an energy system, as is used in fuel cell vehicles, and methods for operating the multi-phase converter, are described herein.

8 Claims, 1 Drawing Sheet

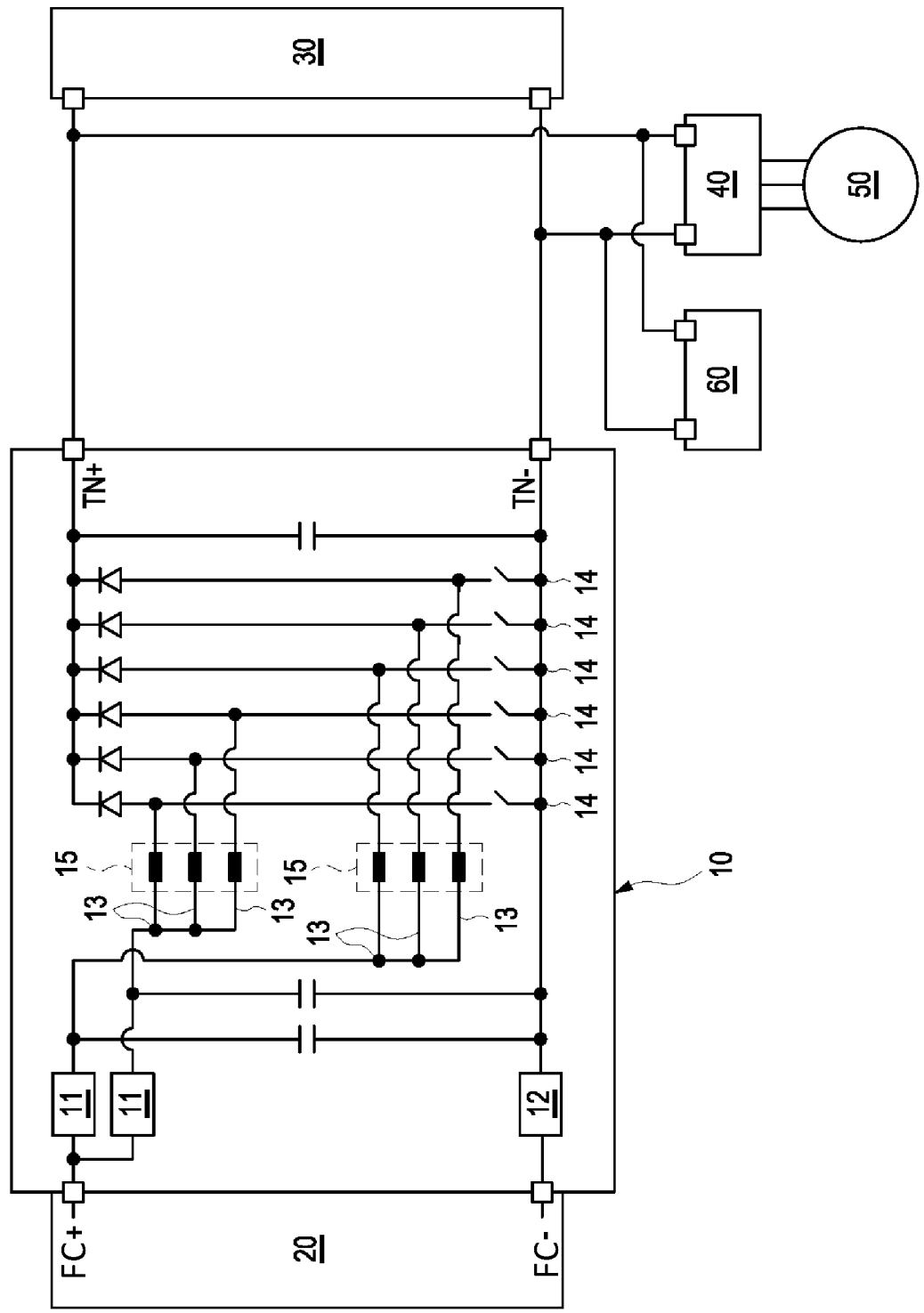

MULTI-PHASE DIRECT VOLTAGE CONVERTER FOR A FUEL CELL STACK

BACKGROUND

Technical Field

The invention relates to a multi-phase converter for an energy system, as is used in fuel cell vehicles, and to methods for operating the multi-phase converter.

Description of the Related Art

In fuel cell vehicles the fuel cell system is usually connected to the rest of the high-voltage (HV) system (HV battery, electrical drive train, other HV components) via a direct voltage converter (DC/DC converter). The main function of said DC/DC converter is the voltage adjustment between the fuel cell and the HV battery. As a rule, said DC/DC converter is configured as a step-up converter. In order to minimize current and voltage ripples and to achieve other technical characteristics, said step-up converter is usually configured as a multi-phase converter.

Switch-off elements are used to ensure that the fuel cell can be separated from the rest of the HV system. Examples of switch-off elements are electromechanical contactors (MC) and semiconductor switches (SS). The switch-off elements must be designed for the maximum continuous operating current of the fuel cell. Since very high fuel cell currents can occur during operation, the corresponding limits of components are reached very quickly, or even exceeded.

The object of the present invention is to provide a direct voltage converter which overcomes this disadvantage.

Various approaches have already become known for constructing direct voltage converters in such a way that their components can be dimensioned for lower current intensities or that the current carrying capacity of individual components is not exceeded during operation.

DE 10 2011 018 355 A1 discloses a direct voltage converter for stepping up and/or stepping down voltages, for example for use in a solar inverter circuitry. The direct voltage converter has at least a first terminal, at least one second terminal and at least a third terminal, with a flow of energy between the first and second terminals on the one hand and the third terminal on the other hand being possible. The direct voltage converter contains a first half-bridge, which is connected in parallel to the first terminal and has a series connection of at least a first switching device and a second switching device, and a second half bridge, which is connected in parallel to the second terminal, and has a series connection of at least a third switching device and at least a fourth switching device. Here the midpoint of the first half-bridge is connected via at least one choke with a midpoint of the second half-bridge. The construction presented makes it unnecessary to oversize the choke.

DE 10 2014 201 615 A1 presents a construction of a multi-phase direct voltage converter, which enables an improved control of the converter when operating near a change in the operating mode. When the phase currents in the multi-phase direct voltage converter reach a predetermined threshold value, then the target values for the individual phase currents are spread, so that only a minimum number of direct voltage converters undergo a mode change at the same time. In this way, the dynamics of a current control during the transition between two modes of operation within the multi-phase direct voltage converter is maintained and the voltage stability can be improved.

DE 10 2007 025 229 A1 discloses a multi-phase direct voltage converter having multiple converter cells arranged in parallel to one another and clocked in a time-staggered manner and provided with a voltage sensor or a current sensor on the input side and/or output side of the converter cells. Said sensor is connected to a separator via an analog-digital converter, wherein said separator is configured to separate the output signal of the analog-digital converter into voltage values or current values associated with individual phases of the converter. The separator is connected to a control system which outputs control signals influencing the clock signals of the converter cells. With the design presented, the number of current sensors required can be reduced.

BRIEF SUMMARY

In order to ensure that the current carrying capacity of the switch-off elements is not exceeded during operation, a parallel connection of two or more switch-off elements could also be considered. In the case of electromechanical contactors, a simple parallel connection is hardly feasible, since the current distribution between the individual contactors cannot be set and controlled, rather it is determined, for example, by different transition resistances or unequal lead lengths.

According to the invention, therefore, in a DC-DC converter configured as a multi-phase converter part of the phases, for example, half or one third, is combined with its own electromechanical contactor in each case. In doing so, the current through the respective switch-off elements can be reduced in the range of the maximum current carrying capacity, without having to worry about a non-uniform current distribution on the respective switch-off elements. The more or less independent current control of the individual phases can ensure the even current distribution.

The invention relates to a multi-phase direct voltage converter comprising a plurality of current regulators (phases) connected in parallel, each having an input connected to a positive path of the multi-phase direct voltage converter (or the positive pole of a voltage applied to the input of the converter) and an input connected to a negative path of the multi-phase direct voltage converter (or the negative pole of a voltage applied to the input of the converter). In case of the multi-phase direct voltage converter, in an embodiment, the inputs of the current regulators connected to the positive path are divided into at least two groups, in another embodiment the inputs of the current regulators connected to the negative path are divided into at least two groups, and in a third embodiment, both inputs of the current regulators connected to the positive path and inputs of the current regulators connected to the negative path are each divided into at least two groups. The inputs within a group are interconnected, and each group is associated with a switch-off element.

In an embodiment, the multi-phase direct voltage converter comprises at least three current regulators (phases) connected in parallel, for example three, four or five phases; in another embodiment, the multi-phase direct voltage converter comprises at least six current regulators (phases) connected in parallel, e.g., six, eight or ten phases.

In an embodiment of the multi-phase direct voltage converter, the current regulators are configured as step-up converters. In another embodiment, the current regulators are configured as step-down converters. In another embodiment, the current regulators are configured as inverse converters. In another embodiment, the current regulators are configured as synchronous converters. Other converter topologies such as SEPIC converters, Čuk converters, zeta converters, double inverters, or split-pi converters can also be used in the multi-phase direct voltage converter according to the invention.

The phases of the multi-phase direct voltage converter according to the invention are divided into at least two groups. Each group comprises part of the phases, e.g., half or one third; and each group is associated with its own switch-off element in the positive path and/or negative path of the converter. The number of phases per group depends on factors such as the total number of phases, the maximum current per phase and the maximum current per switch-off element. In an embodiment, one switch-off element is present for each phase.

The division takes place in that the inputs of the current regulators connected to the positive path and/or the inputs of the current regulators connected to the negative path are divided into at least two groups. The inputs within a group are interconnected and each group is associated with a switch-off element.

In an embodiment, a switch-off element is associated with each of the input of the current regulators connected to the positive path and/or each of the input of the current regulators connected to the negative path.

Components known in principle to the person skilled in the art are used as switch-off elements, e.g., electromechanical contactors and semiconductor switches such as power transistors or thyristors. In an embodiment, the switch-off elements comprise at least one electromechanical contactor. In another embodiment, the switch-off elements comprise at least one semiconductor switch. In a specific embodiment, the semiconductor switch comprises at least one MOSFET or one IGBT.

The invention also relates to a method for operating a multi-phase direct voltage converter according to the invention. In an embodiment of the method, all of the switch-off elements present in the converter are controlled in unison. In another embodiment of the method, the switch-off elements present in the converter are controlled in groups. In another embodiment of the method, each of the switch-off elements present in the converter is controlled individually.

The advantages of the direct voltage converter according to the invention include that it is ensured that the limits of components are observed which enables the use of standard elements, whereby the total cost of the direct voltage converter are reduced also.

A controlled parallel connection of a plurality of switch-off elements is made possible, whereby high fuel cell currents can be realized, or assembly space can be saved by using a plurality of small switch-off elements. The parallel connection is not limited to electromechanical contactors. This method can also be applied to other switch-off elements or switching elements in general.

Further advantages and embodiments of the invention will become apparent from the description and the accompanying drawing.

It is to be understood that the features mentioned above and those yet to be explained below can be used not only in the combination specified in each case, but also in other combinations or on their own without departing from the scope of the present invention.

BRIEF DESCRIPTION OF THE DRAWING

The FIGURE shows a schematic representation of an embodiment of the direct voltage converter according to the invention.

DETAILED DESCRIPTION

The FIGURE shows schematically an embodiment of the direct voltage converter 10 according to the invention. The input of the DC/DC converter 10 is connected to the poles (FC+, FC−) of a fuel cell stack 20. The output (TN+, TN−) of the DC/DC converter 10 is connected to the traction circuit of a motor vehicle to which, in addition to a HV battery 30, electric motors 50 are connected via pulse inverters 40. In the version shown, other HV components 60 are connected to the electric circuit, e.g., auxiliary units of the fuel cell, chargers, 12 V DC/DC converters, air conditioning compressors, HV heaters, etc.

The FIGURE shows a six phase DC/DC converter 10 that is configured as a step-up converter. However, the number of phases can also be higher or lower. A combination of various switch-off elements is present to ensure that the fuel cell stack 20 can be separated from the rest of the HV system. In the block diagram shown, two electromechanical contactors 11 are provided in the positive path of the DC/DC converter 10, and a semiconductor switch 12 is provided in the negative path as switch-off elements. In the embodiment shown, three of the six phases are interconnected to form a sub-group 15 by interconnecting the inputs 13 of the associated current regulators connected to the positive path of the converter 10. The sub-groups 13 are each connected to an electromechanical contactor 11. The inputs 14 of the associated current regulators connected to the negative path of DC/DC converter 10 are all connected to semiconductor switch 12. The switch-off elements 11 and 12 can be controlled both in unison and individually or in groups. The control means used for this purpose are not shown in the drawing.

In the case of a step-up converter, a parallel connection of electromechanical contactors is only useful in the positive path. In the case of other DC/DC converter topologies, a parallel connection in the negative path can also make sense. The parallel connection is not limited to electromechanical contactors, but can also be used with other switch-off elements.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A multi-phase direct voltage converter, comprising:
 a first switch-off element configured to be coupled to a first pole of a fuel cell;
 a second switch-off element configured to be coupled to the first pole of the fuel cell;
 a third switch-off element configured to be coupled to a second pole of the fuel cell;
 a group of first current regulators each including:
  a first input coupled to the first switch-off element, wherein the first switch-off element is coupled between the first inputs of the first current regulators and the first pole of the fuel cell; and a second input coupled to the third switch-off element, wherein the third switch-off element is coupled between the second inputs of the first current regulators and the second pole of the fuel cell; and a group of second current regulators each including:
a first input coupled to the second switch-off element, wherein the second switch-off element is coupled between the first inputs of the second current regulators and the first pole of the fuel cell; and
a second input coupled to the third switch-off element, wherein the third switch-off element is coupled between the second inputs of the second current regulators and the second pole of the fuel cell.

2. The multi-phase direct voltage converter according to claim 1, wherein the group of first current regulators includes three first current regulators connected in parallel with one another.

3. The multi-phase direct voltage converter according to claim 1, wherein the first and second current regulators are step-up converters.

4. The multi-phase direct voltage converter according to claim 1, wherein the first switch-off element includes at least one electromechanical contactor.

5. The multi-phase direct voltage converter according to claim 1, wherein the first switch-off element includes at least one semiconductor switch.

6. The multi-phase direct voltage converter according to claim 5, wherein the semiconductor switch includes at least one MOSFET or one IGBT.

7. A method for operating a multi-phase direct voltage converter, the multi-phase direct voltage converter including:
a first switch-off element configured to be coupled to a first pole of a fuel cell;
a second switch-off element configured to be coupled to the first pole of the fuel cell;
a third switch-off element configured to be coupled to a second pole of the fuel cell;
a group of first current regulators each including:
a first input coupled to the first switch-off element, wherein the first switch-off element is coupled between the first inputs of the first current regulators and the first pole of the fuel cell; and
a second input coupled to the third switch-off element, wherein the third switch-off element is coupled between the second inputs of the first current regulators and the second pole of the fuel cell; and
a group of second current regulators each including:
a first input coupled to the second switch-off element, wherein the second switch-off element is coupled between the first inputs of the second current regulators and the first pole of the fuel cell; and
a second input coupled to the third switch-off element, wherein the third switch-off element is coupled between the second inputs of the second current regulators and the second pole of the fuel cell;
wherein the method comprises controlling the first and second switch-off elements in unison.

8. A method for operating a multi-phase direct voltage converter, the multi-phase direct voltage converter including:
a first switch-off element configured to be coupled to a first pole of a fuel cell;
a second switch-off element configured to be coupled to the first pole of the fuel cell;
a third switch-off element configured to be coupled to a second pole of the fuel cell;
a group of first current regulators each including:
a first input coupled to the first switch-off element, wherein the first switch-off element is coupled between the first inputs of the first current regulators and the first pole of the fuel cell; and
a second input coupled to the third switch-off element, wherein the third switch-off element is coupled between the second inputs of the first current regulators and the second pole of the fuel cell; and
a group of second current regulators each including:
a first input coupled to the second switch-off element, wherein the second switch-off element is coupled between the first inputs of the second current regulators and the first pole of the fuel cell; and
a second input coupled to the third switch-off element, wherein the third switch-off element is coupled between the second inputs of the second current regulators and the second pole of the fuel cell;
wherein the method comprises controlling the first and second switch-off elements individually.

* * * * *